(12) United States Patent
Jeong et al.

(10) Patent No.: US 9,502,910 B2
(45) Date of Patent: Nov. 22, 2016

(54) POWER CHARGING APPARATUS AND BATTERY APPARATUS

(71) Applicant: SAMSUNG ELECTRO-MECHANICS CO., LTD., Suwon, Gyunggi-do (KR)

(72) Inventors: In Wha Jeong, Gyunggi-do (KR); Hugh Wook Kim, Gyunggi-do (KR); Jae Suk Sung, Gyunggi-do (KR); Sung Youl Choi, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 219 days.

(21) Appl. No.: 14/199,718

(22) Filed: Mar. 6, 2014

(65) Prior Publication Data
US 2014/0266033 A1    Sep. 18, 2014

Related U.S. Application Data

(60) Provisional application No. 61/799,319, filed on Mar. 15, 2013.

(30) Foreign Application Priority Data

Aug. 30, 2013  (KR) .................. 10-2013-0104472

(51) Int. Cl.
*H02J 7/00* (2006.01)
*H02J 7/02* (2016.01)

(52) U.S. Cl.
CPC ............ *H02J 7/0013* (2013.01); *H02J 7/0055* (2013.01); *H02J 7/025* (2013.01)

(58) Field of Classification Search
CPC ........... H02J 7/025; H02J 17/00; H02J 5/005

USPC .......................................................... 320/108
See application file for complete search history.

(56) References Cited

U.S. PATENT DOCUMENTS 7,948,208 B2 *   5/2011   Partovi ................. H02J 7/0027
                                                      320/108

(Continued)

FOREIGN PATENT DOCUMENTS

DE    102009035167 A1    2/2010
EP       2523303 A2     11/2012

(Continued)

OTHER PUBLICATIONS

Extended European Search Report issued in Application No. 14275046.2 dated Mar. 4, 2015.

*Primary Examiner* — Nghia Doan
(74) *Attorney, Agent, or Firm* — NSIP Law

(57) ABSTRACT

A power charging apparatus and a battery apparatus quickly charge a battery with power by separately charging each battery cell with power. The power charging apparatus includes: a power supplier supplying power; and a charging part having at least two chargers corresponding one-to-one to at least two battery cells connected to each other in parallel, each of the at least two chargers charging the corresponding battery cell with power transmitted from the power supplying unit. The battery apparatus includes: a battery having at least two battery cells connected to each other in parallel; and a charging part having at least two chargers corresponding one-to-one to the at least two battery cells and charging the at least two chargers with power received.

19 Claims, 13 Drawing Sheets

(56) References Cited

U.S. PATENT DOCUMENTS

| | | | |
|---|---|---|---|
| 8,314,592 B2 * | 11/2012 | Rudorff | H02J 7/0016 320/116 |
| 2010/0327810 A1 | 12/2010 | Jimbo et al. | |
| 2011/0101916 A1 | 5/2011 | Densham et al. | |
| 2011/0291491 A1 | 12/2011 | Lemmens et al. | |
| 2012/0139492 A1 * | 6/2012 | Kleffel | H01G 9/155 320/118 |
| 2012/0194127 A1 | 8/2012 | Kobayashi et al. | |
| 2012/0256585 A1 * | 10/2012 | Partovi | H01F 5/003 320/108 |
| 2012/0268238 A1 * | 10/2012 | Park | G07F 15/006 340/5.8 |
| 2013/0127405 A1 | 5/2013 | Scherer et al. | |
| 2013/0257371 A1 | 10/2013 | Komai et al. | |

FOREIGN PATENT DOCUMENTS

| | | |
|---|---|---|
| JP | 2011-101572 A | 5/2011 |
| KR | 10-2013-0044308 A | 5/2013 |
| KR | 10-2013-0054897 A | 5/2013 |
| WO | 2011/046223 A1 | 4/2011 |

* cited by examiner

POWER CHARGING APPARATUS AND BATTERY APPARATUS

CROSS-REFERENCE TO RELATED APPLICATIONS

This application claims the benefit of U.S. Provisional Patent Application No. 61/799,319 filed on Mar. 15, 2013 with the U.S. Patent and Trademark Office and Korean Patent Application No. 10-2013-0104472 filed on Aug. 30, 2013 with the Korean Intellectual Property Office, the disclosures of which are incorporated herein by reference.

BACKGROUND

The present disclosure relates to a power charging apparatus and a battery apparatus capable of quickly charging a battery cell with power.

An electric or electronic apparatus refers to an apparatus operated by using electricity as an energy source.

In order to operate the electric or electronic apparatus, power, which is the energy source necessary to operate the apparatus, needs to be supplied, where power should be supplied from the outside unless the apparatus receives power with self-generating electricity.

Therefore, in order for the electric or electronic apparatus to receive power from the outside, a power supply unit for transferring power from the external power supplier to the electric or electronic apparatus is necessary.

A power supply unit which connects to the electronic apparatus directly with a wired scheme using a connector, or the like, to thereby supply power to a battery embedded in the electronic apparatus is used. As an alternative, a power supplier may supply power to the battery embedded in the electronic apparatus with a non-contact scheme, for example, magnetic induction effect or magnetic resonance effect.

Meanwhile, a mobile device such as a smart phone, a tablet personal computer (PC), a detachable laptop PC, or the like, consumes a large amount of power to meet user's demands for a large screen, or the like. To keep up with consumption of a large amount of power of the mobile device, battery capacity of the mobile device has been gradually increased. As such, charging time of the battery may become longer due to the large battery capacity. A need exists for providing a power charging apparatus and a battery apparatus to quickly charge a battery with power.

SUMMARY

An aspect of the present disclosure may provide a power charging apparatus and a battery apparatus capable of quickly charging a battery with power by separately charging each battery cell with power.

According to an aspect of the present disclosure, a power charging apparatus may include: a power supplier supplying power; and a charging part having at least two chargers charging power received from the power supplier to at least two battery cells connected to each other in parallel. Each of the at least two chargers one to one corresponds to each of the at least two battery cells, and charges the power to the corresponding each of the at least two battery cells. The power supplier may supply power to the charging part in a wired scheme.

Each of the at least two chargers may receive power from a plurality of power sources which are independent from each other.

Each of the at least two chargers may be insulated from each other.

The power supplier may transmit power to the charging part in a wireless scheme.

The power supplier may include: a power converting unit providing a preset power; and at least one power transmission coil transmitting power from the power converting unit in a wireless scheme.

Each of the at least two chargers of the charging part may include: a power reception coil receiving power transmitted from the at least one power transmission coil in a wireless scheme; and a charging controller receiving power from the power reception coil to thereby control a current value of power charged into the corresponding battery cell.

The power supplier may include a first number of the power transmission coils, and the first number corresponds to a number of reception coils of the charger.

According to another aspect of the present disclosure, a battery apparatus may include: a battery having at least two battery cells connected to each other in parallel; and a charging part having at least two chargers charging power received from a power supplier to the at least two battery cells. Each of the at least two chargers one to one corresponds to each of the at least two battery cells, and charges the power to the corresponding each of the at least two battery cells.

The battery may include a plurality of battery groups having a plurality of battery cells connected to one another in series and each charged with power from the corresponding charger, and the plurality of battery groups may be connected to one another in parallel.

Another aspect of the disclosure provides a charging apparatus configured to charge a battery having at least two battery cells. The charging apparatus comprises a charging part having at least two chargers charging power received from an external power supplier to the at least two battery cell. Each of the at least two chargers one to one corresponds to each of the at least two battery cells. The charging part charges the power to the corresponding each of the at least two battery cells.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1A:
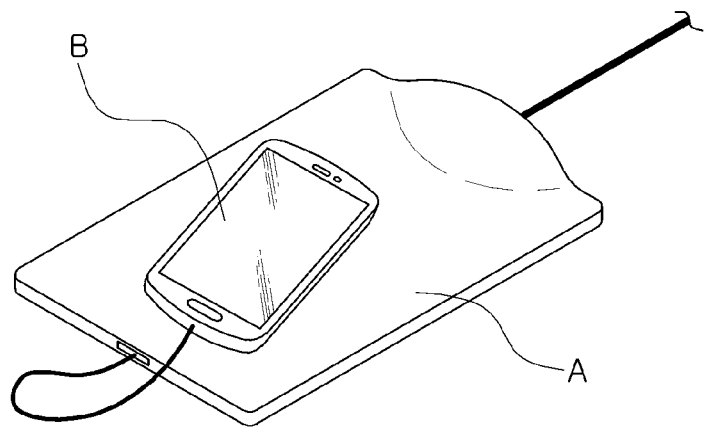
FIGS. 1A through 1C illustrate examples utilizing a power charging apparatus according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1B:
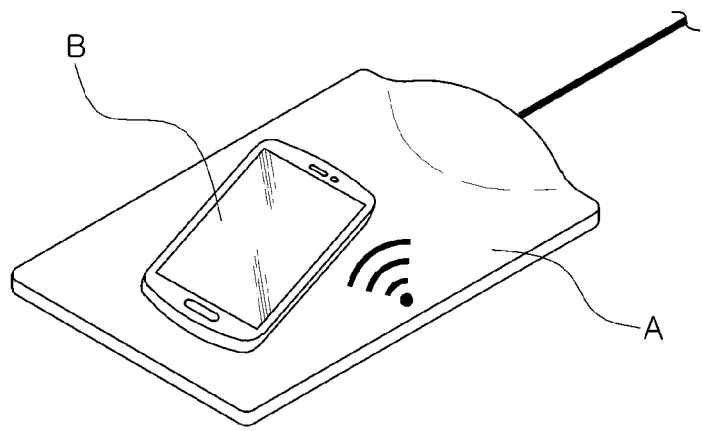
Figure 1C:
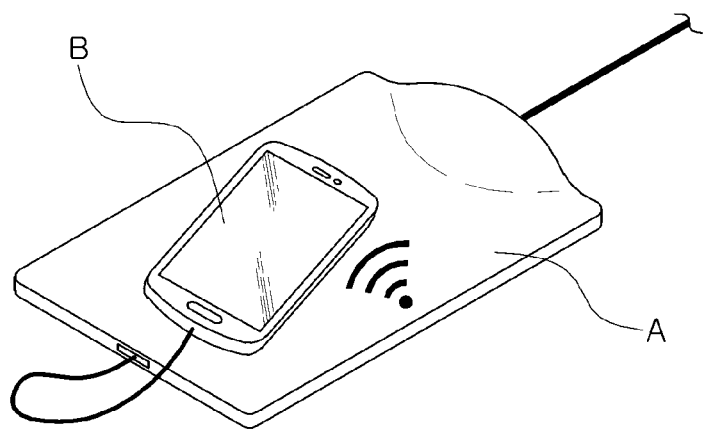

FIGS. 1A through 1C illustrate examples utilizing a power charging apparatus according to an exemplary embodiment of the present disclosure.

Referring to FIGS. 1A through 1C, a power charging apparatus A according to an exemplary embodiment of the present disclosure may quickly charge each battery cell in an electronic device including a battery apparatus having a plurality of battery cells with power in a wired scheme (FIG. 1A), a wireless scheme (FIG. 1B), or a wired and wireless scheme (FIG. 1C). The electronic device to be charged is not limited to a mobile phone, but includes any device equipped with a battery such as a tablet PC, and a laptop PC.

Figure 2:
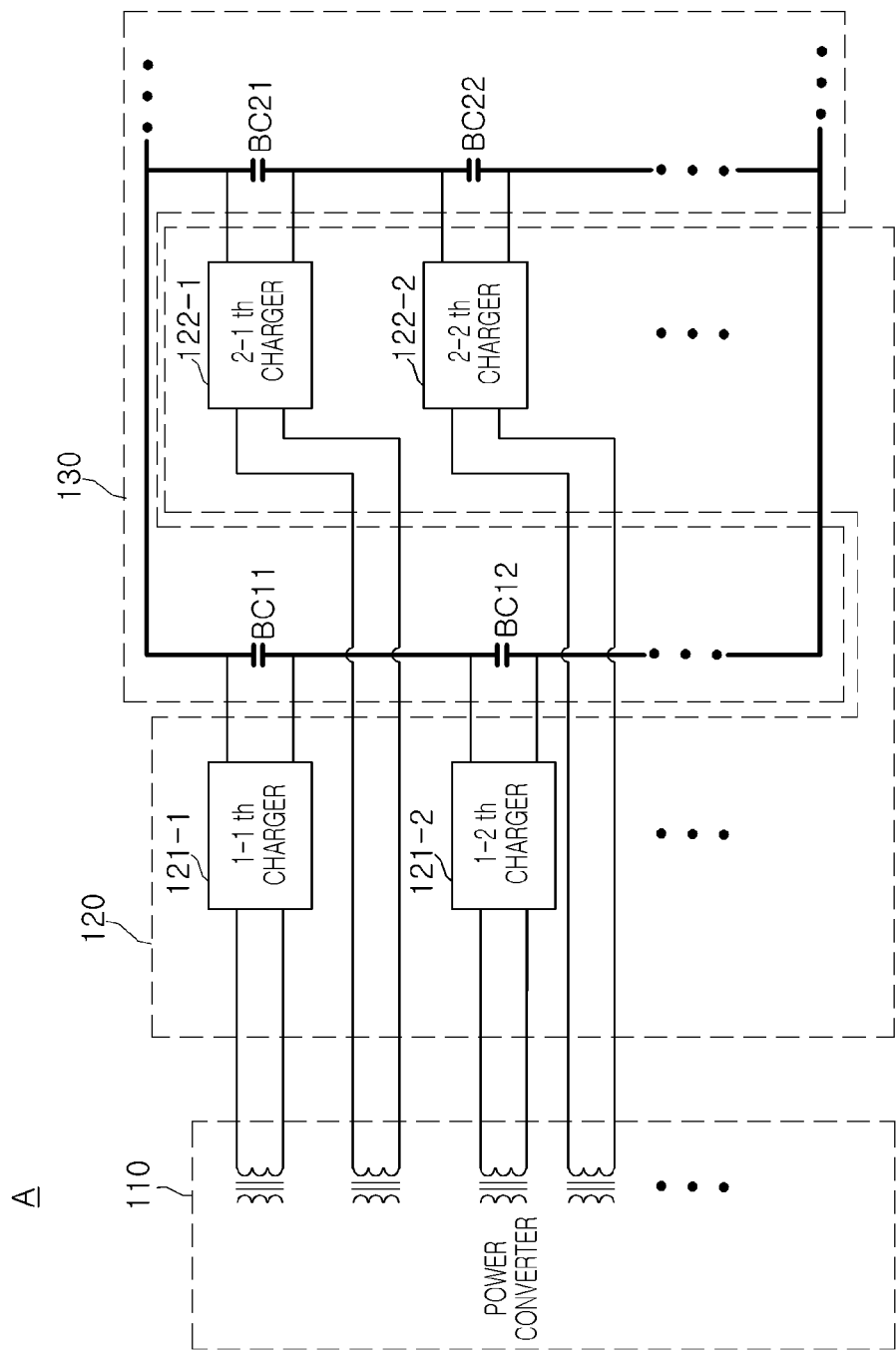
FIGS. 2 through 4 illustrate schematical diagrams of first to third exemplary embodiments of a power charging apparatus according to the present disclosure.
Figure 3:
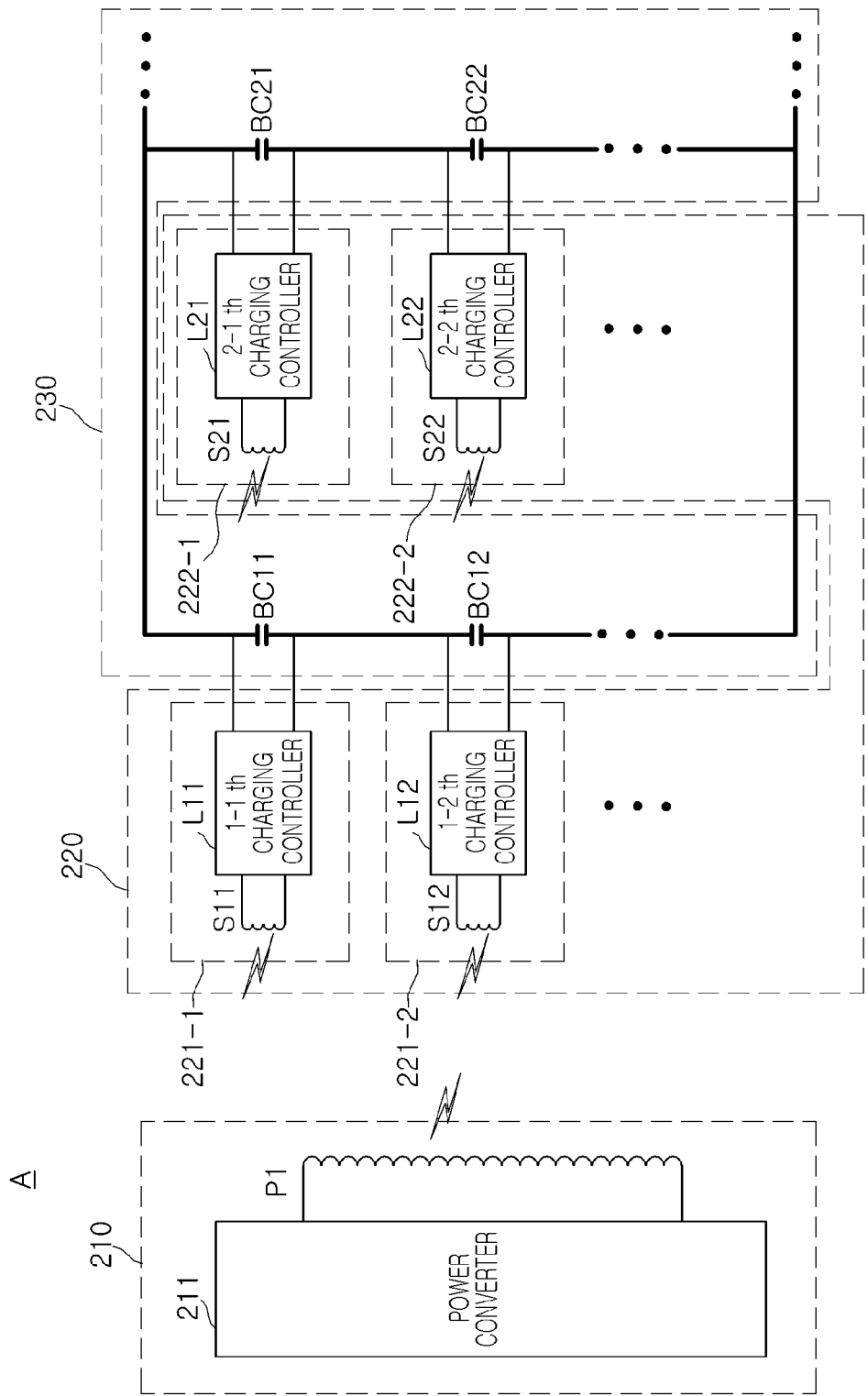
Figure 4:
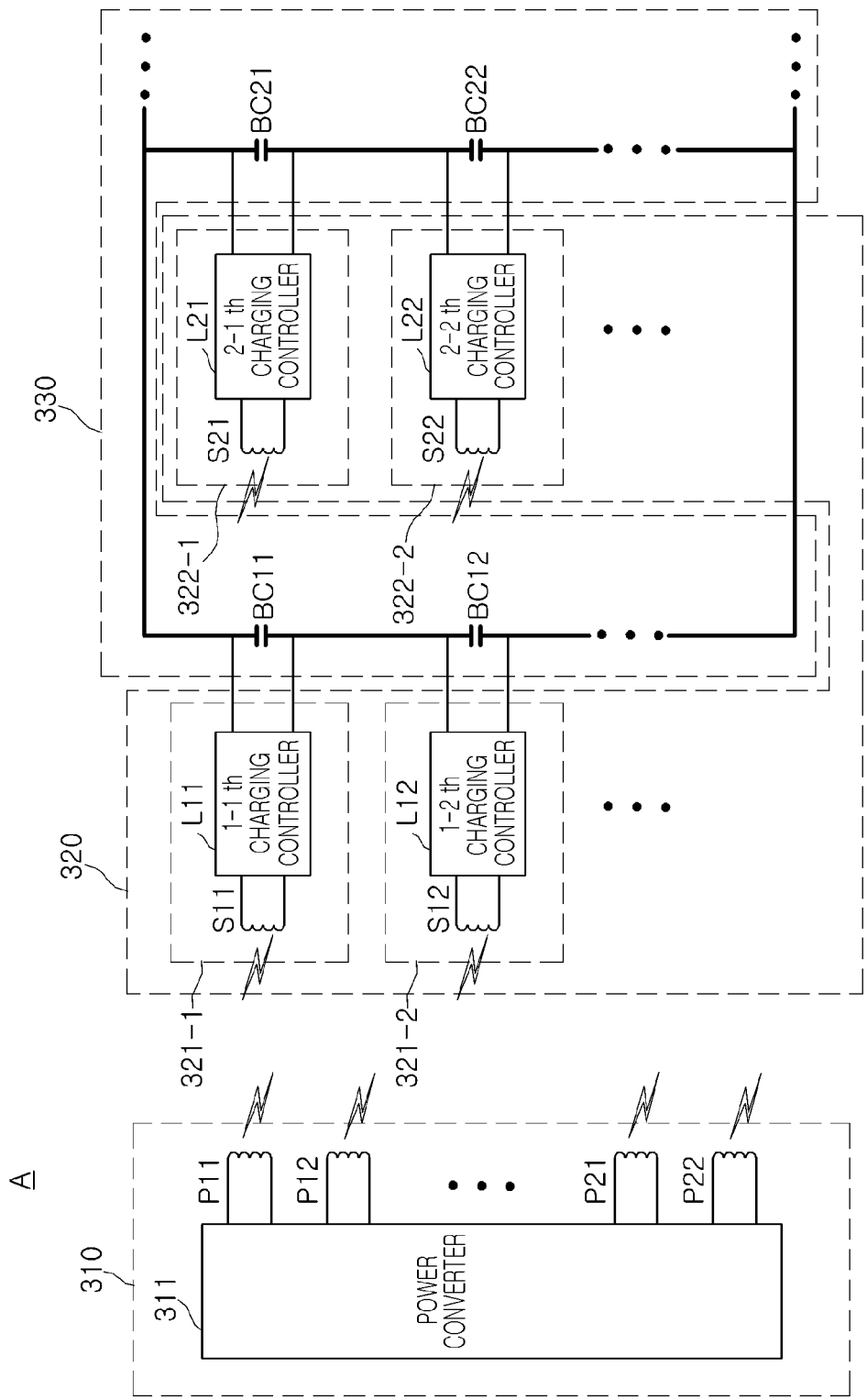

FIGS. 2 through 4 illustrating schematic diagrams of first to third exemplary embodiments of a power charging apparatus according to the present disclosure.

Referring to FIG. 2, the power charging apparatus A according to an exemplary embodiment of the present disclosure may include a power supplying unit 110 and a charging part 120.

The power supplying unit 110 may transfer power to the charging part 120 in the wired scheme and the charging part 120 may include a plurality of chargers 121-1, 121-2, 122-1, and 122-2, and each of the plurality of chargers 121-1, 121-2, 122-1, and 122-2 may charge the corresponding battery cell BC11, BC12, BC21, and BC22 with power.

Each of the plurality of chargers 121-1, 121-2, 122-1, and 122-2 may receive power from an independent power source, the power supplying unit 110, and each of the plurality of chargers 121-1, 121-2, 122-1, and 122-2 may be insulated from one another.

Therefore, even in the middle of fast charging of the battery cell, a discharging operation providing power to a device to operate the corresponding device may be performed. The battery unit 130 may be used for charging the battery apparatus B and include the plurality of battery cells BC11, BC12, BC21, and BC22, and the plurality of battery cells BC11, BC12, BC21, and BC22 may have at least two battery cells connected to each other in parallel. As illustrated, the battery unit 130 may include at least two battery cell groups connected to each other in parallel and the at least two battery cell groups may include the plurality of battery cells BC11, BC12, BC21, and BC22 connected to one another in series. Here, a 1-1st battery cell BC11 and a 1-2nd battery cell BC12 may be connected to each other in series to thereby form one battery cell group, a 2-1st battery cell BC21 and a 2-2nd battery cell BC22 may be connected to each other in series to thereby form the other battery cell group, and the battery cells may be connected to one another in parallel. Although at least two battery cell groups are illustrated, a plurality of battery cell groups may be connected to one another in parallel, and although at least two battery cells are illustrated in each battery cell group, a plurality of battery cells may be connected to one another in series in one battery cell group.

The battery cells BC11, BC12, BC21, and BC22 may correspond one-to-one to the chargers 121-1, 121-2, 122-1, and 122-2, and each of the chargers 121-1, 121-2, 122-1, and 122-2 may control a current value of power charged into the corresponding battery cells BC11, BC12, BC21, and BC22, respectively, so as to become a maximum allowable current or less of the corresponding battery cell.

For example, in the case in which the maximum allowable current of the battery cell is 1 A, when one charger charges the plurality of battery cells connected to one another in parallel with power, power having a current value corresponding to a total sum of the maximum allowable current of the plurality of battery cells needs to be charged. However, this may cause problems such as heating of the charger, an enlargement of a circuit, and use of expensive elements. On the other hand, when the current value of power in which one charger charges the plurality of battery cells connected to one another in parallel is decreased in order to prevent these problems, it may take a long time to charge the plurality of battery cells connected to one another in parallel with power.

Therefore, the power charging apparatus according to an exemplary embodiment of the present disclosure may include the plurality of chargers corresponding one-to-one to the plurality of battery cells connected to one another in parallel, such that it may control the current value of power charged into the corresponding battery cell to be maintained at the maximum allowable current of the battery cell, if necessary, and control the current value of power charged into the corresponding battery cell to be maintained at the maximum allowable current or less when power charged into the battery cell approaches a full charge.

Therefore, the battery cell may be quickly charged with power while solving the problems such as heating of the charger at the time of the power charging, the enlargement of the circuit, and the use of the expensive elements.

Referring to FIGS. 3 and 4, the power charging apparatus A according to an exemplary embodiment of the present disclosure may wirelessly transmit power from the power supplying units 210 and 310. To this end, the power supplying units 210 and 310 may include power converting units 211 and 311 providing a preset power and power transmission coils P1, P11, P12, P21, and P22 transmitting power from the power converting units 211 and 311 wirelessly.

The power supplying units 210 and 310 may include one power transmission coil P1 as illustrated in FIG. 2, and may include a plurality of power transmission coils P11, P12, P21, and P22 to increase transmission efficiency of power, the number of the plurality of power transmission coils P11, P12, P21, and P22 may correspond to the number of power reception coils S11, S12, S21, and S22.

The charging parts 220 and 320 may include a plurality of chargers 221-1, 221-2, 222-1, 222-2, 321-1, 321-2, 322-1, and 322-2, so as to correspond one-to-one to the plurality of battery cells BC11, BC12, BC21, and BC22, of the battery units 230 and 330, and each of the plurality of chargers 221-1, 221-2, 222-1, 222-2, 321-1, 321-2, 322-1, and 322-2 may include the power reception coils S11, S12, S21, and S22 and charging control units L11, L12, L21, and L22 to charge the corresponding battery cells BC11, BC12, BC21, and BC22 with power.

The power reception coils S11, S12, S21, and S22 may receive power from the power transmission coils P1, P11, P12, P21, and P22 of the power supplying units 210 and 310 in a wireless scheme such as a magnetic induction scheme or a magnetic resonance scheme, and the charging control units L11, L12, L21, and L22 may charge the corresponding battery cells BC11, BC12, BC21, and BC22 with power from the power reception coils S11, S12, S21, and S22 and control the current value of power charged into the corresponding battery cell to be maintained at the maximum allowable current of the battery cell, if necessary, and control the current value of power charged into the corresponding battery cell to be maintained at the maximum allowable current or less when power charged into the corresponding battery cell approaches a full charge.

That is, each of a 1-1st charging control unit L11, a 1-2nd charging control unit L12, a 1-3rd charging control unit L13, a 2-1st charging control unit L21, a 2-2nd charging control unit L22, and a 2-3rd charging control unit L23 may control the current value of power charged into the corresponding battery cell BC11, BC12, BC13, BC21, BC22, or BC23 to be maintained at the maximum allowable current of the battery cell, if necessary, and control the current value of power charged into the corresponding battery cell to be maintained at the maximum allowable current or less when power charged into the corresponding battery cell approaches a full charge.

FIGS. 5A through 5D illustrate examples utilizing a battery apparatus according to an exemplary embodiment of the present disclosure.

Figure 5A:
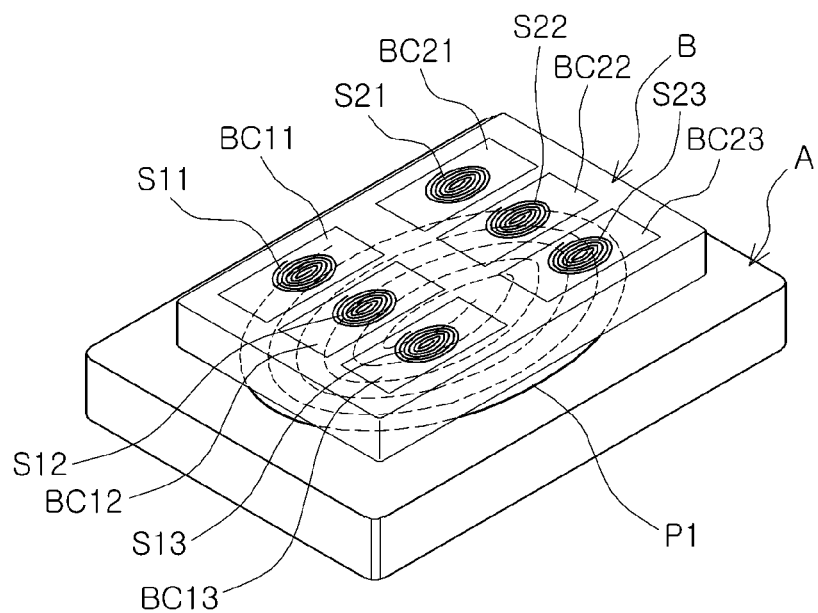
FIGS. 5A through 5D illustrate examples utilizing a battery apparatus according to an exemplary embodiment of the present disclosure.
Figure 5B:
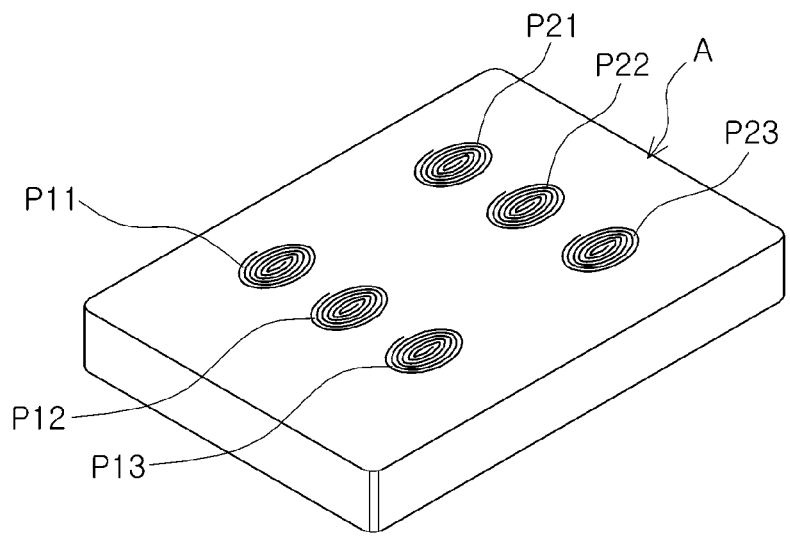
Figure 5C:
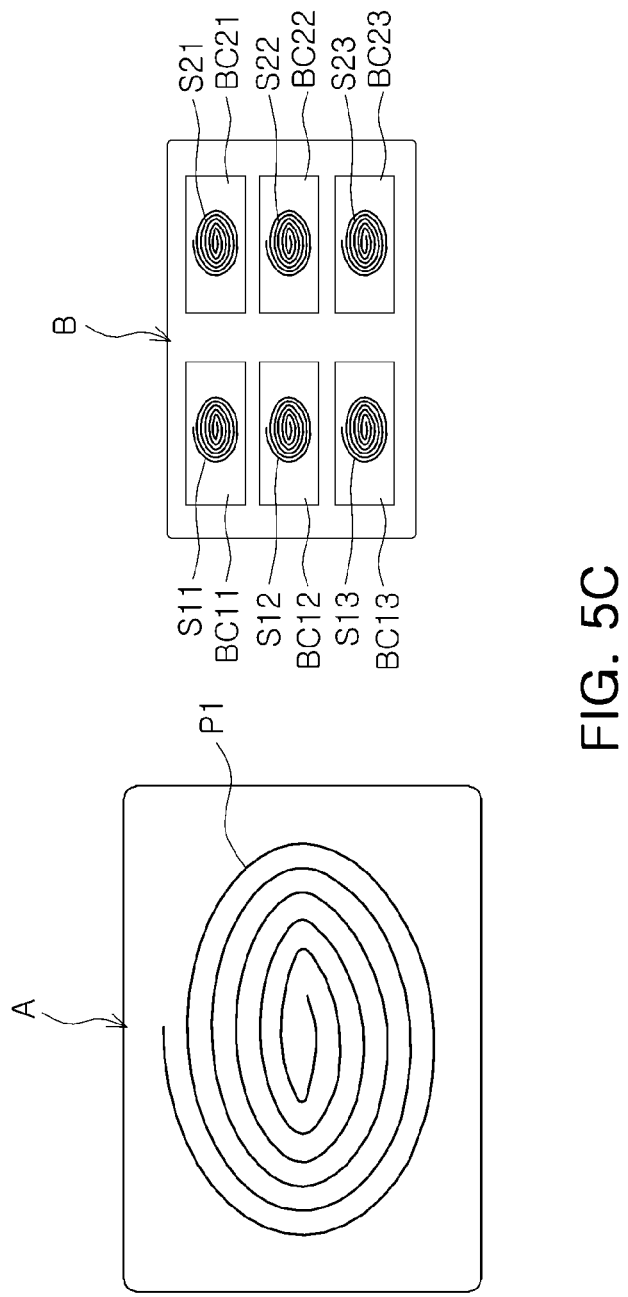
Figure 5D:
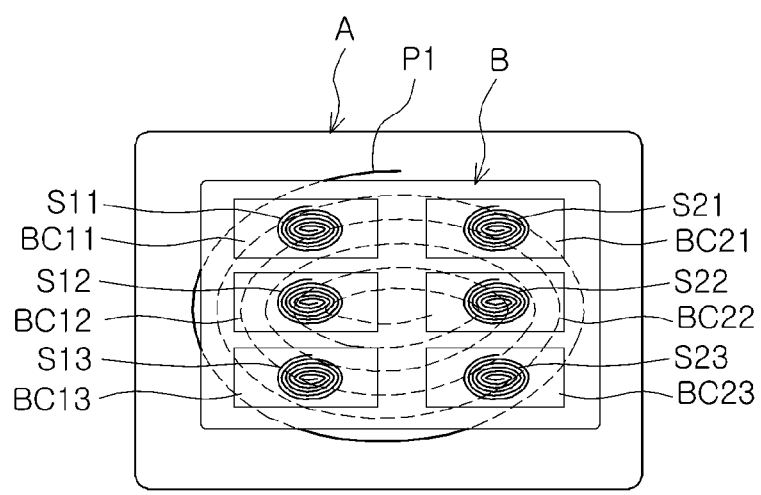

Referring to FIGS. 5A, 5C, and 5D, a battery apparatus B according to an exemplary embodiment of the present disclosure uses six battery cells BC11 to BC23, where among the six battery cells BC11 to BC23, three battery cells BC11, BC12, and BC13 may be connected to each other in series to thereby form one battery cell group and three battery cells BC21, BC22, and BC23 may be connected to each other in series to thereby form one battery cell group, and the two battery cell groups BC11, BC12, BC13 and BC21, BC22, BC23 may be configured to be connected to each other in parallel. (The battery apparatus B according to an exemplary embodiment of the present disclosure may be used for a cellular phone, a tablet PC, a laptop PC, or the like, but respective detailed drawings thereof will be omitted.)

In addition, when power is wirelessly received, the battery apparatus B may include six power reception coils S11 to S23 each corresponding to the six battery cells BC11 to BC23, where the six power reception coils S11 to S23 may wirelessly receive power from the power transmission coil P1 of the power charging apparatus A.

On the other hand, the power charging apparatus A may include the six power transmission coils P11, P12, P13, P21, P22, and P23 corresponding to the six power reception coils S11 to S23.

As described above, referring to FIGS. 5A through 5D, a battery pack generally used for a laptop PC adopts the six battery cells, where the three battery cells among the six battery cells are connected to one another in series to thereby form one battery cell group and the two battery cell groups may be configured to be connected to each other in parallel. Therefore, although the battery apparatus B according to an exemplary embodiment of the present disclosure illustrates the six battery cells configured of the two battery cell groups, as an example, at least two battery cells may be connected to each other in parallel, the plurality of battery cell groups may also be connected to one another in parallel, and each of the plurality of battery cell groups may include the plurality battery cells connected to one another in series.

Figure 6A:
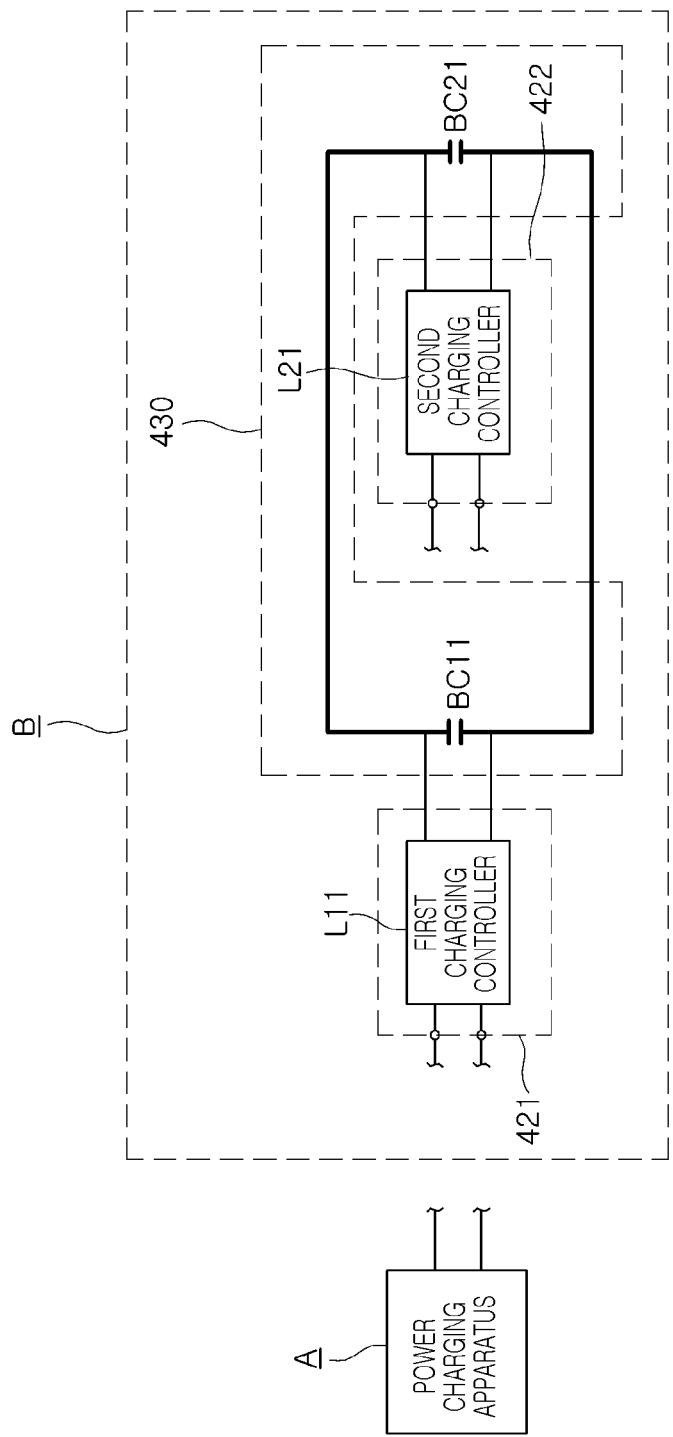
FIGS. 6A through 6C illustrate schematical diagrams of first to third exemplary embodiments of a battery apparatus according to the present disclosure.
Figure 6B:
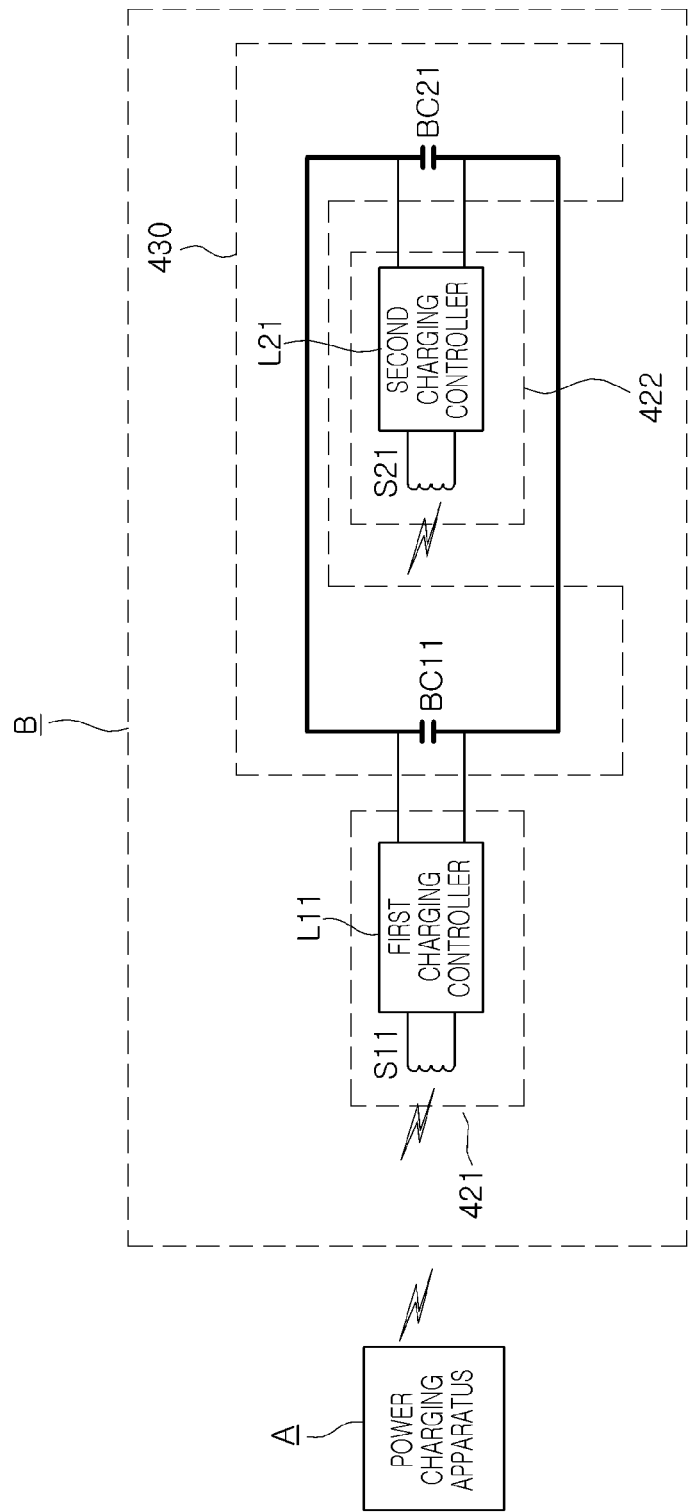
Figure 6C:
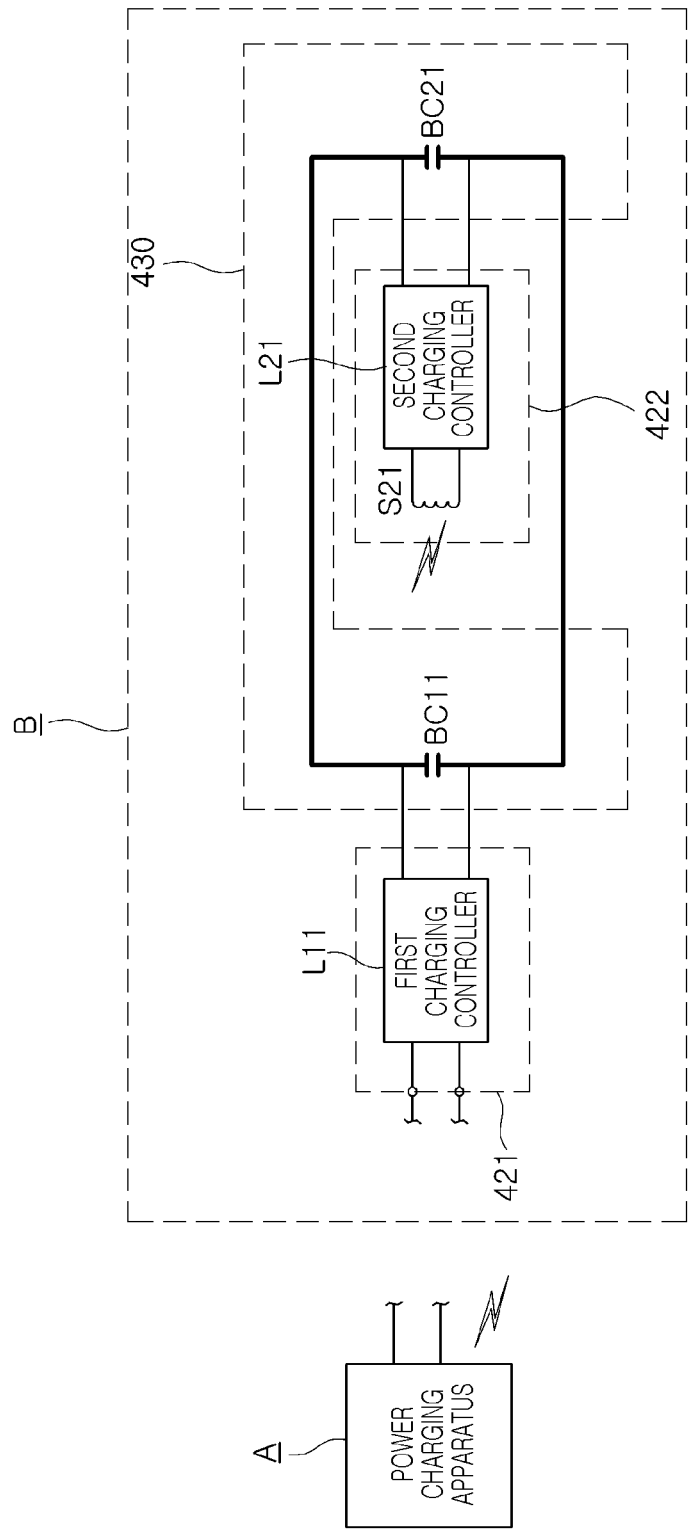

FIGS. 6A through 6C illustrate schematic diagrams of first to third exemplary embodiments of a battery apparatus according to the present disclosure.

Referring to FIGS. 6A through 6C, first to third exemplary embodiments of the battery apparatus B according to the present disclosure may include two battery cells BC11 and BC21 connected to each other in parallel and may each charge the two battery cells BC11 and BC21 connected to each other in parallel with power in a wired scheme, a wireless scheme or a wired and wireless scheme.

More specifically, referring to FIG. 6C, the battery apparatus B may charge one battery cell in the wired scheme and charge the other battery cell in the wireless scheme, among the two battery cells BC11 and BC21 connected to each other in parallel.

In addition, although not illustrated, the battery apparatus B may transmit power to one battery cell of the two battery cells BC11 and BC21 connected to each other in parallel in the wired scheme and the wireless scheme, thereby charging the battery cell more quickly.

Figure 7A:
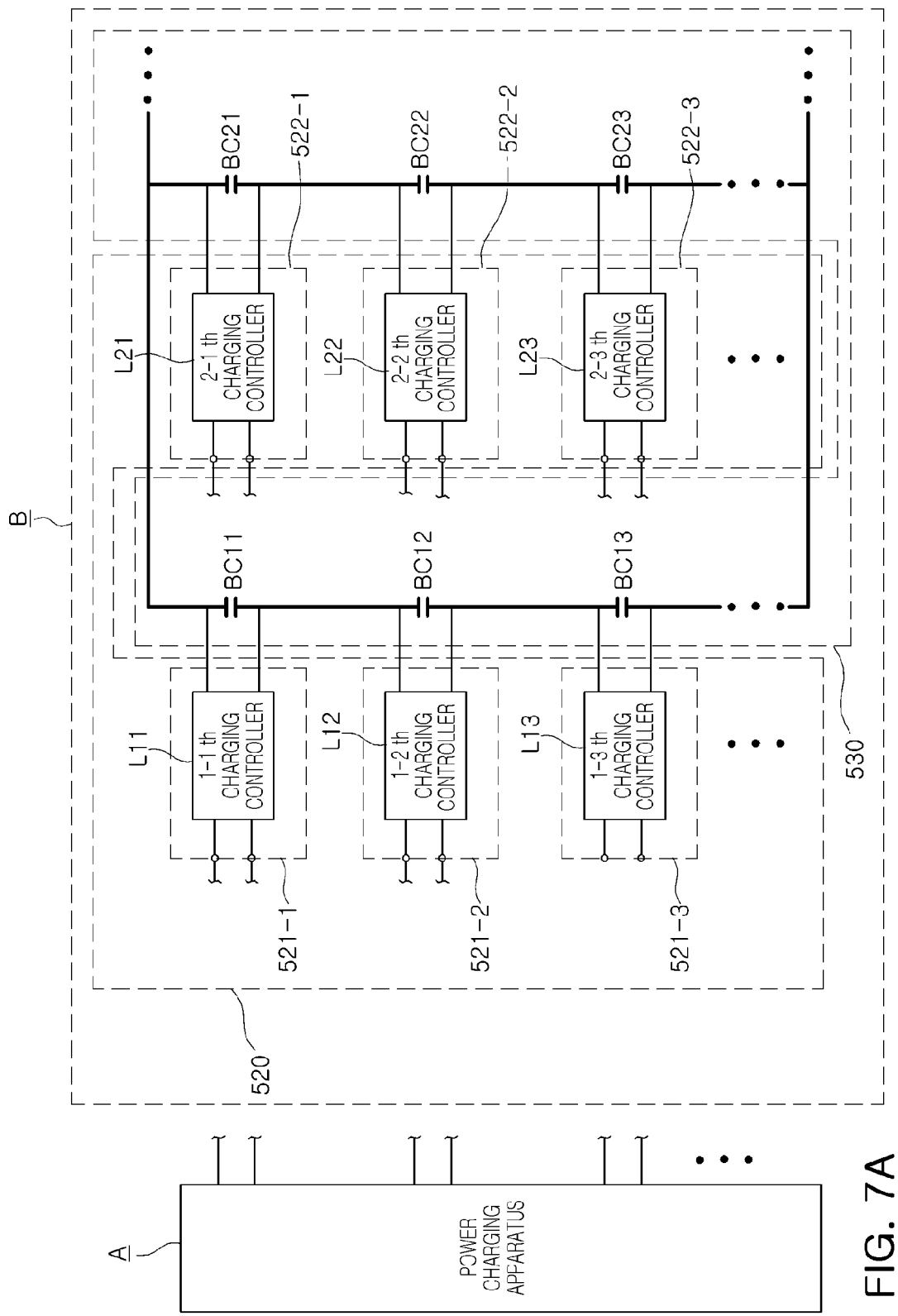
FIGS. 7A and 7B illustrate schematical diagrams of fourth and fifth exemplary embodiments of a battery apparatus according to the present disclosure.
Figure 7B:
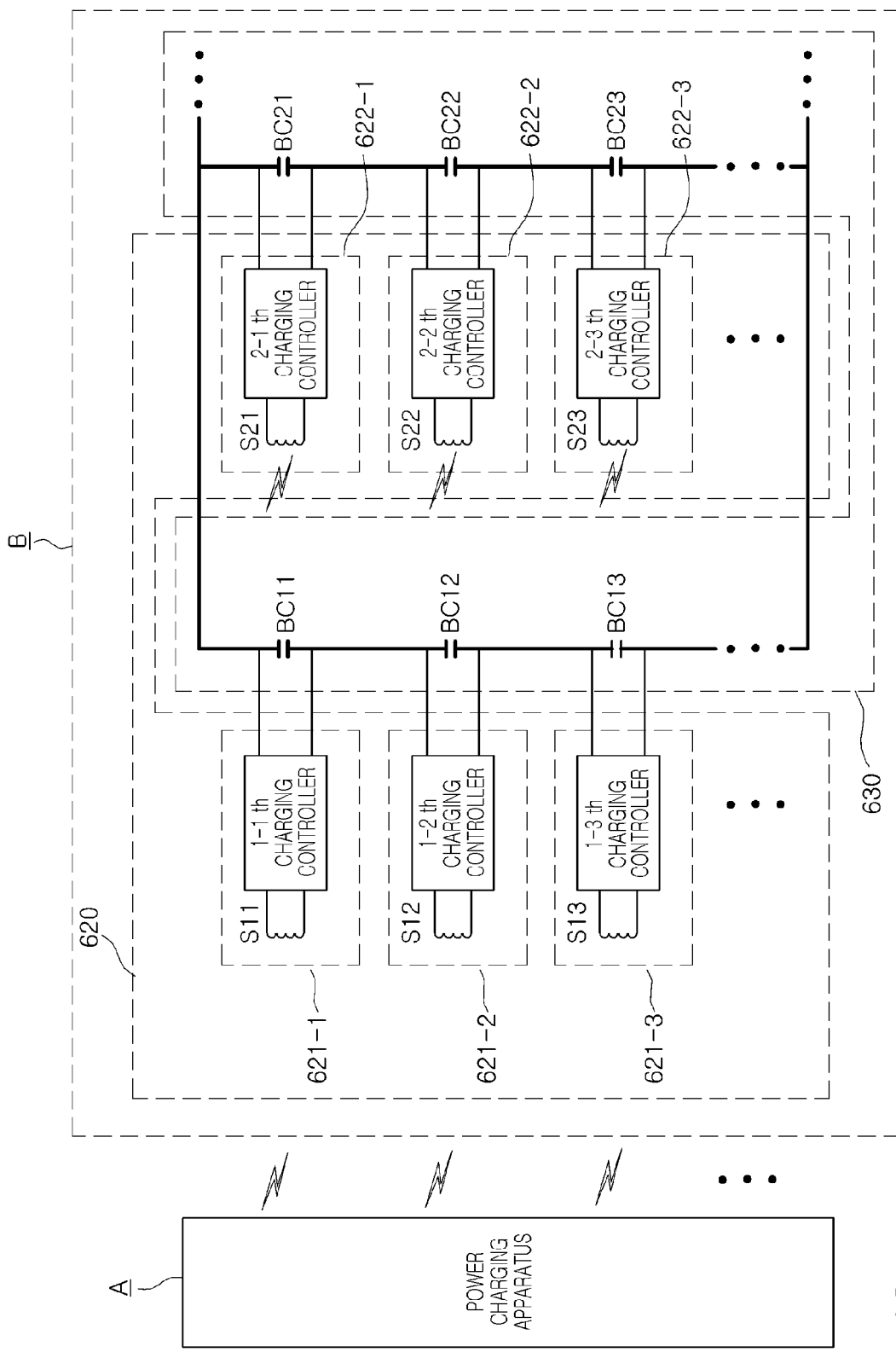

FIGS. 7A and 7B are configuration diagrams schematically illustrating fourth and fifth exemplary embodiments of a battery apparatus according to the present disclosure.

Referring to FIG. 7A, in the fourth exemplary embodiment of the battery apparatus B according to the present disclosure, a charging part 520 may include a plurality of chargers 521-1, 521-2, 521-3, 522-1, 522-2, and 522-3, where the plurality of chargers 521-1, 521-2, 521-3, 522-1, 522-2, and 522-3 may receive power from the outside in the wired scheme. The plurality of chargers 521-1, 521-2, 521-3, 522-1, 522-2, and 522-3 may correspond one-to-one to each of the plurality of battery cells BC11, BC12, BC13, BC21, BC22, and BC23 of a battery unit 530 and each of the plurality of chargers 521-1, 521-2, 521-3, 522-1, 522-2, and 522-3 may charge the corresponding battery cell BC11, BC12, BC13, BC21, BC22, or BC23 with power.

Each of the plurality of chargers 521-1, 521-2, 521-3, 522-1, 522-2, and 522-3 may include the charging control units L11, L12, L13, L21, L22, and L23, where each of a 1-1st charging control unit L11, a 1-2nd charging control unit L12, a 1-3rd charging control unit L13, a 2-1st charging control unit L21, a 2-2nd charging control unit L22, and a 2-3rd charging control unit L23 may control the current value of power charged into the corresponding battery cell BC11, BC12, BC13, BC21, BC22, or BC23 to be maintained at the maximum allowable current of the battery cell, if necessary, and control the current value of power charged into the corresponding battery cell to be maintained at the maximum allowable current or less when power charged into the corresponding battery cell approaches a full charge.

Referring to FIG. 7B, in the fifth exemplary embodiment of the battery apparatus B according to the present disclosure, a charging part 620 may include a plurality of chargers 621-1, 621-2, 621-3, 622-1, 622-2, and 622-3, where the plurality of chargers 621-1, 621-2, 621-3, 622-1, 622-2, and 622-3 may receive power from the outside in the wireless scheme. The plurality of chargers 621-1, 621-2, 621-3, 622-1, 622-2, and 622-3 may correspond one-to-one to each of the plurality of battery cells BC11, BC12, BC13, BC21, BC22, and BC23 of a battery unit 630 and each of the plurality of chargers 621-1, 621-2, 621-3, 622-1, 622-2, and 622-3 may charge the corresponding battery cell BC11, BC12, BC13, BC21, BC22, or BC23 with power.

Each of the plurality of chargers 621-1, 621-2, 621-3, 622-1, 622-2, and 622-3 may include the power reception coils S11, S12, S13, S21, S22, and S23 capable of receiving power from the outside in the wireless scheme and the charging control units L11, L12, L13, L21, L22, and L23 charging the corresponding battery cell BC11, BC12, BC13, BC21, BC22, or BC23 with power received from the power reception coils S11, S12, S13, S21, S22, and S23 and controlling a current value at the time of the charging, where each of a 1-1st charging control unit L11, a 1-2nd charging control unit L12, a 1-3rd charging control unit L13, a 2-1st charging control unit L21, a 2-2nd charging control unit L22, and a 2-3rd charging control unit L23 may control the current value of power charged into the corresponding battery cell BC11, BC12, BC13, BC21, BC22, or BC23 to be maintained at the maximum allowable current of the battery cell, if necessary, and control the current value of power charged into the corresponding battery cell to be maintained at the maximum allowable current or less when power charged into the corresponding battery cell approaches a full charge.

As described above, according to exemplary embodiments of the present disclosure, each battery cell is separately charged with power, such that the battery may be charged with power at the maximum current while solving the problems such as heating of the charger, the enlargement of the circuit, and the use of the expensive elements.

As set forth above, according to exemplary embodiments of the present disclosure, the battery may be quickly charged with power by separately charging each battery cell with power.

While exemplary embodiments have been illustrated and described above, it will be apparent to those skilled in the art that modifications and variations could be made without departing from the spirit and scope of the present disclosure as defined by the appended claims.

What is claimed is:

1. A power charging apparatus, comprising:
a power supplier configured to supply power; and
a charging part comprising chargers configured to receive the power from the power supplier to charge a battery,
wherein the battery comprises battery groups connected to each other in parallel, and each of the battery groups comprises battery cells connected to each other in series, and
wherein each of the chargers charges one battery cell of a corresponding one battery group.

2. The power charging apparatus of claim 1, wherein the power supplier supplies power to the charging part in a wired scheme.

3. The power charging apparatus of claim 2, wherein each of the at least two chargers receives power from a plurality of power sources which are independent from each other.

4. The power charging apparatus of claim 2, wherein each of the at least two chargers is insulated from each other.

5. The power charging apparatus of claim 1, wherein the power supplier transmits power to the charging part in a wireless scheme.

6. The power charging apparatus of claim 5, wherein the power supplier includes:
a power converter providing a preset power; and
at least one power transmission coil transmitting power from the power converter in a wireless scheme.

7. The power charging apparatus of claim 6, wherein each of the chargers of the charging part includes:
a power reception coil receiving power transmitted from the at least one power transmission coil in a wireless scheme; and
a charging controller receiving power from the power reception coil to thereby control a current value of power charged into the corresponding battery cell.

8. The power charging apparatus of claim 7, wherein a number of the power transmission coils corresponds to a number of the power reception coils.

9. A battery apparatus, comprising:
a battery comprising battery groups connected to each other in parallel, wherein each of the battery groups comprises battery cells connected to each other in series; and
a charging part comprising chargers, wherein each of the chargers charges a corresponding one battery cell of a corresponding one battery group.

10. The battery apparatus of claim 9, wherein the charging part receives power in a wired scheme.

11. The battery apparatus of claim 10, wherein each of the at least two chargers receives the power from a plurality of power sources which are independent from each other.

12. The battery apparatus of claim 10, wherein each of the at least two chargers is insulated from each other.

13. The battery apparatus of claim 9, wherein the charging part receives power in a wireless scheme.

14. The battery apparatus of claim 13, wherein each of the chargers of the charging part includes:
a power reception coil receiving power transmitted in the wireless scheme; and
a charging controller receiving power from the power reception coil to thereby control a current value of power charged into the corresponding battery cell.

15. A charging apparatus configured to charge a battery having battery groups connected to each other in parallel, wherein each of the battery groups has battery cells connected to each other in series, the apparatus comprising:
a charging part comprising chargers receiving power from an external power supplier to the battery,
wherein each of the chargers charges one battery cell of a corresponding one battery group.

16. The charging apparatus of claim 15, wherein the charging part receives power in a wired scheme.

17. The charging apparatus of claim 15, wherein the charging part receives power in a wireless scheme.

18. The charging apparatus of claim 15, wherein each of the chargers of the charging part includes:
a power reception coil receiving power transmitted in the wireless scheme; and
a charging controller receiving power from the power reception coil to thereby control a current value of power charged into the corresponding battery cell.

19. The charging apparatus of claim 15, wherein each of the chargers is insulated from each other.

* * * * *